Aug. 2, 1966    C. R. RICE    3,263,589
CAMERA APPARATUS
Filed Aug. 13, 1964    2 Sheets-Sheet 1
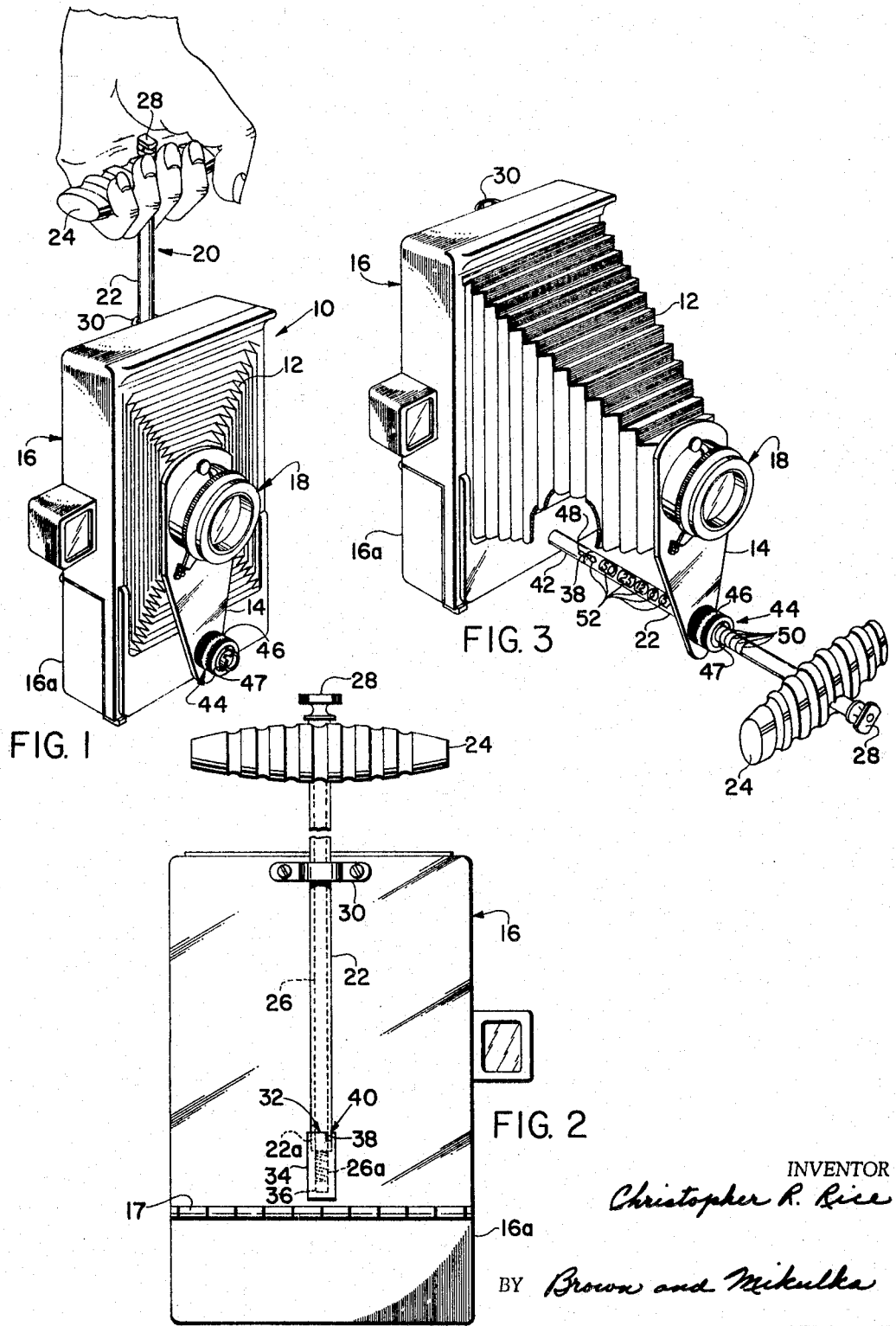
INVENTOR
Christopher R. Rice
BY Brown and Mikulka
ATTORNEYS Aug. 2, 1966          C. R. RICE                3,263,589
                   CAMERA APPARATUS
Filed Aug. 13, 1964                      2 Sheets-Sheet 2

INVENTOR.
Christopher R. Rice
BY Brown and Mikulka
ATTORNEYS

United States Patent Office 3,263,589
Patented August 2, 1966

3,263,589
CAMERA APPARATUS
Christopher R. Rice, Wakefield, Mass., assignor to Polaroid Corporation, Cambridge, Mass., a corporation of Delaware
Filed Aug. 13, 1964, Ser. No. 389,274
8 Claims. (Cl. 95—86)

This invention relates to a camera having a bellows or its equivalent and a movable front, and particularly to novel apparatus for both conveniently transporting the camera and establishing different positions of the movable front, to vary the focus or distance settings.

The present invention is concerned with a camera of a hand-held type embodying multipurpose structure which serves both as a carrying device for conveniently transporting the camera, and as a track or guide as well as an indicia-bearing and positioning means for slidably moving and setting the camera front, in which is mounted the lens, at given locations relative to the focal plane. An additional feature is the inclusion in the handle of the carrying device of a small flashgun. The aforesaid features contribute, together, to a general convenience and ease of change-over from a non-picture-taking to a picture-taking status and vice versa.

An object of the invention is, thus, to provide a relatively simple and efficient apparatus for incorporation with a hand-held, extensible-front type of camera which is adapted to facilitate carrying convenience and safety and which permits ready adjustment of the camera front for focusing purposes without the need of structure solely devoted to the purpose; to provide an apparatus of the character described which is basically adjustable to different given positions for serving both the aforesaid carrying and focusing functions; and to provide apparatus, as described, wherein a handle element of the carrying means houses a flashgun, for use when the apparatus is adjusted for the picture-taking function.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of one embodiment of the transporting and focusing apparatus of the invention incorporated with a camera illustrating its positioning and use for carrying purposes;

FIG. 2 is a diagrammatic rear elevation of the apparatus of FIGURE 1;

FIG. 3 is a diagrammatic perspective view of the apparatus of FIGS. 1 and 2 illustrating its mounting for a focusing function;

Figure 4:
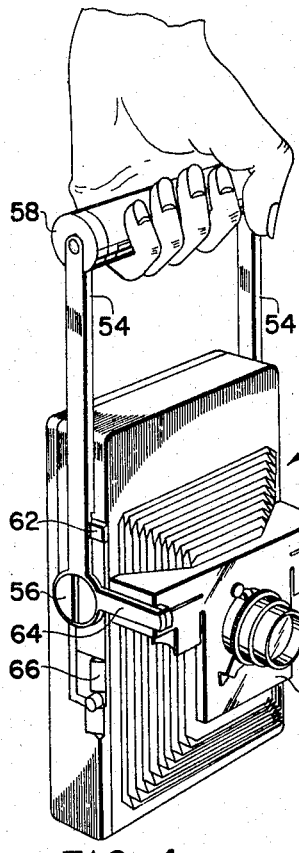
FIG. 4 is a diagrammatic perspective view of another embodiment of apparatus of the invention at the transporting position.

Referring to FIGURE 1, there is shown a camera 10 of a so-called folding category having a collapsible bellows 12 attaching an upstanding front or lens board 14 to the principal camera body or back 16. Merely by way of example to show the suitability of the apparatus with respect thereto, the camera illustrated is of a type having a processing chamber in the back for receiving a film pack of a self-processing category through a pivotal casing portion 16a, hinged at 17, and is adapted to produce a completed photographic print through a diffusion transfer process. A lens and shutter assembly 18 is mounted on the camera front, although any type of shutter, including one associated with the focal plane rather than with the lens, may be employed.

An assembly 20 of the apparatus for conveniently carrying the camera comprises the tubular shaft 22, the elongated handle 24 and the retaining rod 26, with integral knurled nut or knob 28 fixed to an extremity thereof. The assembly is releasably attached to the camera back by cooperating elements, more specifically illustrated in FIG. 2. The shaft 22 is slidably mounted in the U-shaped bracket 30, an end portion 22a of the tube being of reduced diameter and inserted in the smooth bore 32 of a mounting receptacle or adapter 34. The bracket 30 and receptacle 34 are mounted on the non-pivotal casing of the camera back. The end of the major diametric portion of the tubular shaft 22 is thus brought into abutting contact with the edge of the receptacle 34. A smaller threaded bore 36 of the receptacle is adapted to receive and engage the threaded extremity 26a of rod 26 when the knob 28 is manually turned, e.g., clockwise, to mutually engage the respective threaded portions. The shaft 22 is thus firmly joined to the receptacle 34. The correct rotational position of the shaft 22 is established by the entrance of the key 38 of the shaft in the slot 40 of the receptacle. This establishes the handle 24 so that its long dimension is parallel to the rear surface or plane of the camera back and provides a preferred position of the handle for long-distance carrying purposes, i.e., for achieving camera balance and carrying ease when traveling and when no picture-taking is underway or immediately contemplated. By turning the knob 28 to the limit permitted by the respective threaded portions of the rod and receptacle, the carrying assembly of shaft and handle is firmly seated and attached to the camera. By loosening the knob 28 completely, the shaft 22, handle 24, and associated components can be separated entirely from the camera.

The position of the apparatus shown in FIGURE 1, with the shaft 22 extending outwardly from and generally in a principal plane of the camera back, permits enclosure of the camera in a case, e.g., a flexible case (not shown), folding around or having an aperture for accommodating the shaft 22.

In FIG. 3, an assembly of the apparatus, above described with respect to a transport function, is shown in conjunction with other cooperating elements for slidably adjusting the camera front to obtain focusing adjustments. A tubular mounting receptacle or adapter 42, having an internal structure identical to that of the adapter 34 and similar in diameter to the round shaft 22, is mounted on the front face of the camera back so as to project forwardly, as illustrated. The terms forwardly and rearwardly are used herein in the sense of toward the front or toward the rear of a camera. A gripping or chuck-type positioning or locating element 44, including a rotatable knurled adjusting nut 46 and a split inner core 47, is mounted on the camera front 14, in slidable or fixed engagement with the adapter 42, depending upon the loosened or tightened adjustment, respectively, of element 44. The chuck element encircles and, when tightened, firmly grips the adapter 42, this being accomplished by tightening the knurled nut 46 to hold the bellows and camera front at the completely retracted position, shown in FIGURE 1.

The assembly of tubular shaft 22, handle 24, retaining rod 26 and knob 28 is fastened to the adapter 42 in the manner previously described with respect to the adapter 34, the key 38 first being inserted in the slot 48 and the knob 28 turned to provide complete engagement of the threaded end of the retaining rod 26 with the internal threads of the adapter. The adjusting nut 46 of the chuck element is manually loosened slightly and drawn upon, forwardly, to advance the camera front, as permitted by the flexible bellows, in the manner shown in FIG. 3, the loosened chuck now serving as a bearing means in slidable engagement with the tubular shaft 22. The latter, in this operation, serves the function of a guide or track member. The tubular shaft or guide member 22 is provided with a plurality of banded index marks 50, each mark representing an individual distance or focusing adjustment of the lens. The front surface of the positioning chuck element 44 constitutes a movable index for location against any one of the marks 50. While each band 50 may, in any convenient manner, be rendered identifiable as to the distance which it represents, the fact that the bands are located longitudinally very close together presents a problem relative to associated numerals which would be sufficiently large to be legible. This is overcome by the fact that the bands may be provided, as understood to be the case in the illustration, in different colors and the associated distances inscribed as indicia 52 in corresponding colors, along another portion of the track 22. Proper positioning of the indicia 52 for ready reading is insured by the position of the key 38 in thes slot 48 which brings the numbers to the conveniently-viewed location shown.

When the camera is in repeated use, that is, when it is being employed for a succession of exposures with the apparatus of the invention positioned as shown in FIG. 3, it can also be carried, if desired, by the handle 24. To return the apparatus to the position of FIGURE 1, merely a reversal of the procedures above-described with respect to setting up the picture-taking arrangement of FIG. 3, is followed.

Figure 5:
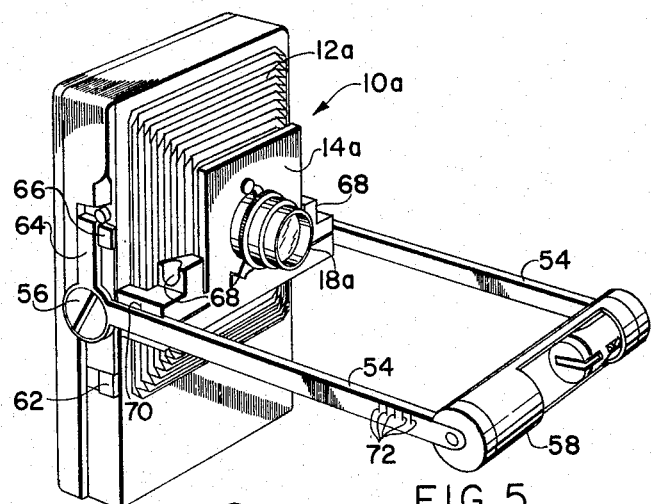
FIGS. 5 and 6 are diagrammatic perspective views illustrating the focusing function of the apparatus of FIG. 4.
Figure 6:
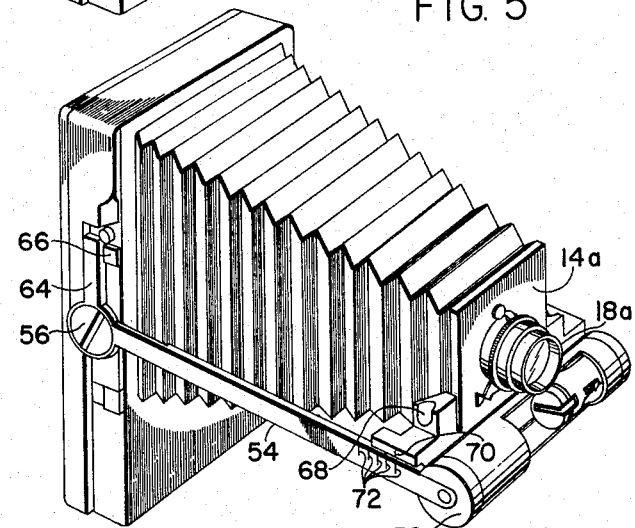
Figure 7:
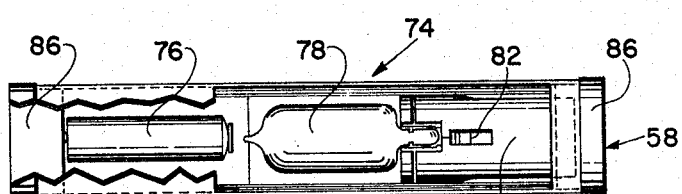
FIGS. 7 and 8 are diagrammatic elevational views of the handle-flashgun structure.
Figure 8:
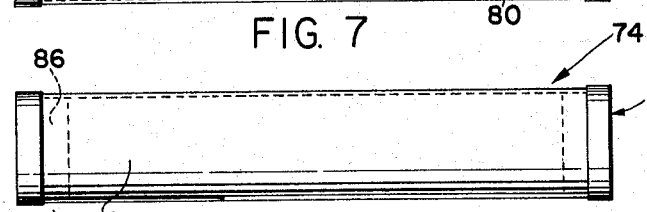

A modification of the apparatus embodied in a hand-held camera 10a is illustrated in FIGS. 4 through 8, a non-picture-taking or protracted carrying arrangement of elements being shown in FIG. 4 and preliminary and final picture-taking adjustments or arrangements being represented in FIGS. 5 and 6, respectively. The apparatus includes the pair of elongated bars or shafts 54 serving as combined carrying and focus-adjusting track members pivotally mounted on the pair of studs 56 (one shown); the handle 58 located at an extremity of and mounted transversely or horizontally between the bars 54; the pairs of detent elements 62, 64 and 66 (elements at one side of the camera only, being shown) for releasably holding the two bar members 54 fixed at either of two functional positions, one of which positions in line with the camera back is shown in FIG. 4 and the other, at 90° relative thereto, in FIGS. 5 and 6; the compressible locating and guide means 68 for slidably moving and setting the camera front 14a, including the lens assembly 18a, back-and-forth along the tracks 54 to position the movable index 70 with respect to the fixed indicia 72 representative of various distances, as permitted by the expansible bellows 12a; and the flashgun 74 mounted in handle 58, the latter being hollowed to provide a chamber for accommodating the flashgun. With respect to the detent elements, the elements 62 and 66 are compressible, e.g., formed of a resilient plastic or metal and, when compressed, permit free movement of the bar elements 54 and the projecting appendage 64.

The flashgun assembly includes a battery 76, a flashbulb 78, a side-mounting socket 80 with bulb-ejector release button 82, and a sheath 84 rotatably mounted on end-pieces 86. The sheath, when rotated to an open position, permits direct or bounce flash operation. At closed position it serves as a cover and provides an unbroken outer surface of the handle. To implement the positioning of the flashgun and the directions at which it may be aimed, the handle 58 may be pivotally connected at one end with one of the bars 54 and releasably connected at the other end with the second of the bars 54 by any suitable latching means. The detents 60 are compressible to permit the shafts 54 to be pivoted to the position of FIGS. 5 and 6. From the latter or picture-taking position they may be returned to the carrying location of FIGURE 1 by compressing the detents 66.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for incorporation with a hand-held camera of a type including a back element and an extensible front element, said apparatus being adapted to undergo differential arrangement relative to said camera for conveniently and rapidly serving the dual functions of providing both transportation adaptability and variation of focal characteristics, and comprising elongated shaft means, a carrying handle attached to one extremity of said shaft means, means for positioning and holding said shaft means at a first location so that it extends in a given direction outwardly from and in a principal plane of said camera back element with said handle thus located to best advantage for carrying purposes, means for positioning and holding said shaft means at a second location so that it extends outwardly from said camera back in a direction substantially at 90° to said first-named direction, and locating means attached to said camera front element adapted to slidably engage said shaft means.

2. Apparatus, as defined in claim 1, wherein said shaft means carries indicia relating to different distance settings inscribed on a surface thereof, and wherein said locating means includes an indexing element for registration with any of said indicia to provide said variation of focal characteristics.

3. Apparatus, as defined in claim 1, wherein said shaft means is detachably mounted on a first adapter means of said camera back for transportation purposes and when detached from said first adapter means is releasably mounted on a second adapter means of said camera back for providing said variation of focal characteristics.

4. Apparatus, as defined in claim 1, wherein said handle is in the form of a hollow chamber including a movable cover and wherein said chamber serves to mount a flashgun.

5. Apparatus, as defined in claim 1, wherein said shaft means is pivotally mounted on said camera back element to permit its movement to said first and second locations.

6. Apparatus, as defined in claim 5, wherein detent means are provided to releasably hold said shaft means at said first and second locations.

7. Apparatus, as defined in claim 3, wherein said shaft and adapter means are releasably held in a given firm engagement with one another by key means and threaded mutually-engaging components associated with said shaft and said adapter means, respectively, 8. Apparatus, as defined in claim 3, wherein said shaft means is a single shaft and wherein said locating means of said front is in the form of a chuck-type of element releasably-engaging said shaft means to permit its slidable movement and its fixed positioning thereon.

References Cited by the Examiner

UNITED STATES PATENTS 1,053,400  2/1913  Johnson _____ 95—86

JOHN M. HORAN, *Primary Examiner.*